United States Patent [19]

Harrison

[11] Patent Number: 4,946,357

[45] Date of Patent: Aug. 7, 1990

[54] DIVERTER CHUTE ASSEMBLY FOR MOLDING MACHINE

[76] Inventor: James Harrison, 13182 Marshall La., Bldg. 103, Ste. 318, Tustin, Calif. 92680

[21] Appl. No.: 428,976

[22] Filed: Oct. 30, 1989

[51] Int. Cl.[5] .............................................. B29C 45/00
[52] U.S. Cl. .................................. 425/182; 193/31 A; 425/139; 425/556; 425/217; 425/436 R
[58] Field of Search ................. 425/139, 554, 556, 444, 425/438, 217, 182, 190, 436 R; 193/31 A X, 31 R; 198/360

[56] References Cited

U.S. PATENT DOCUMENTS

| | | | |
|---|---|---|---|
| 465,720 | 12/1891 | Murphey | 193/31 A |
| 684,250 | 10/1901 | Holmes | 193/31 A |
| 2,582,891 | 1/1952 | Strauss | 425/556 |
| 2,995,775 | 8/1961 | Schnitzius et al. | 425/217 |
| 3,278,992 | 10/1966 | Strauss | 425/156 |
| 3,508,299 | 5/1967 | Ahern | 18/30 |
| 3,572,424 | 9/1968 | Byrne | 164/347 |
| 3,669,592 | 6/1972 | Miller | 425/155 |
| 3,776,675 | 12/1973 | Veneria | 425/139 |
| 3,986,811 | 10/1976 | Gunnels | 425/556 |
| 4,589,840 | 5/1986 | Schad | 425/556 |
| 4,710,124 | 12/1987 | Harrison | 425/554 |

FOREIGN PATENT DOCUMENTS

| | | | |
|---|---|---|---|
| 53-5256 | 1/1978 | Japan . | |
| 0167233 | 10/1982 | Japan | 425/139 |
| 59-20233 | 2/1984 | Japan . | |

OTHER PUBLICATIONS

Toshiba Machine Co., America, High precision Injection Molding Machine ISE 90PN 1986.
Toshiba Machine Co., America Super Innovation Injection Molding Machine ISE 310 ISE 390, 1984.
Toshiba Machine Co., America High Precision Injection Molding Machine, ISE 120N, ISE 170N, ISE 250N, 1986.
Toshiba Machine Co., America, Super Innovation Injection Molding Machine ISE 30P, ISE 60P, 1984.

*Primary Examiner*—Willard Hoag
*Attorney, Agent, or Firm*—And Brunda Stetina

[57] ABSTRACT

A diverter chute assembly for automatically separating the molded part from the runner in the injection molding process. The diverter chute assembly has a deflection plate pivotally mounted within a housing. The deflection plate is responsive to control signals generated in synchronization with the ejection of the product and the runner such that the product is directed to a first collection area and the runner is directed to a second collection area. Chute diverters permit flexibility in the placement of collection bins which gather the parts and runners.

6 Claims, 2 Drawing Sheets

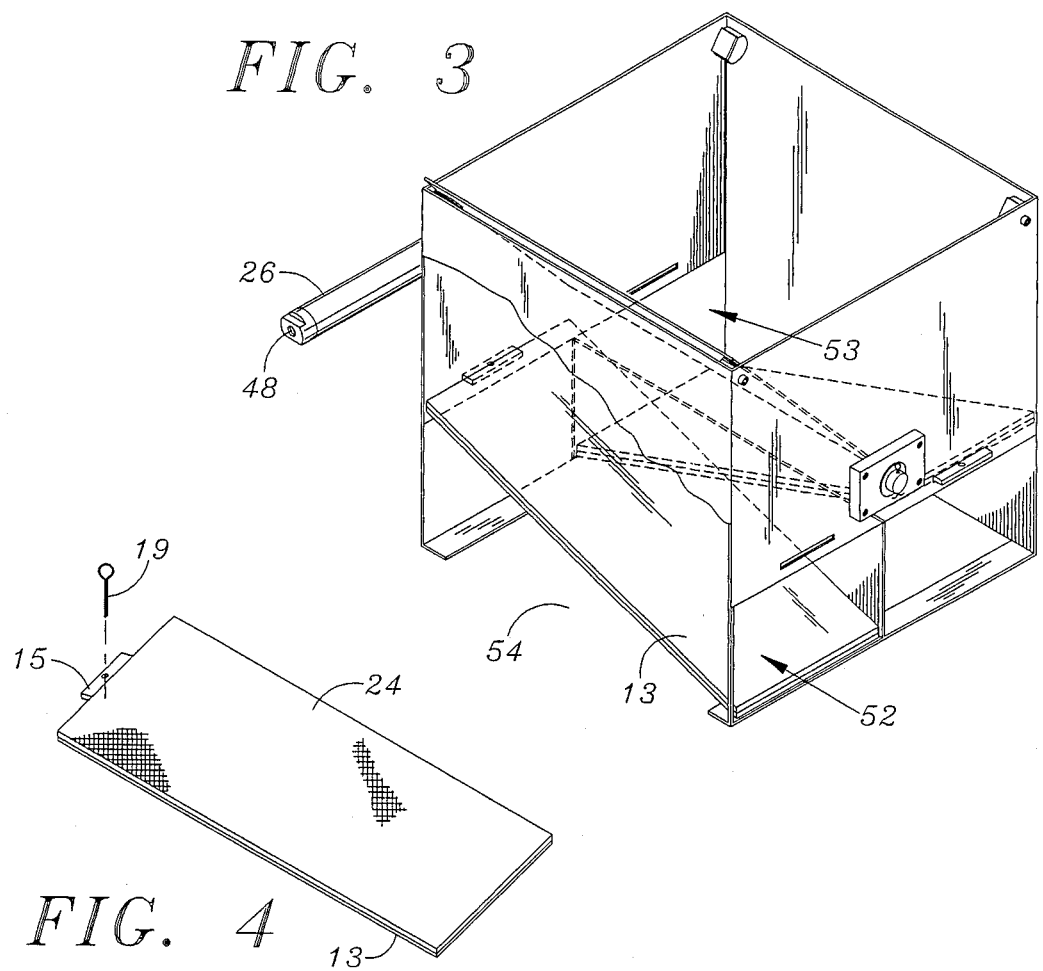
FIG. 3
FIG. 4
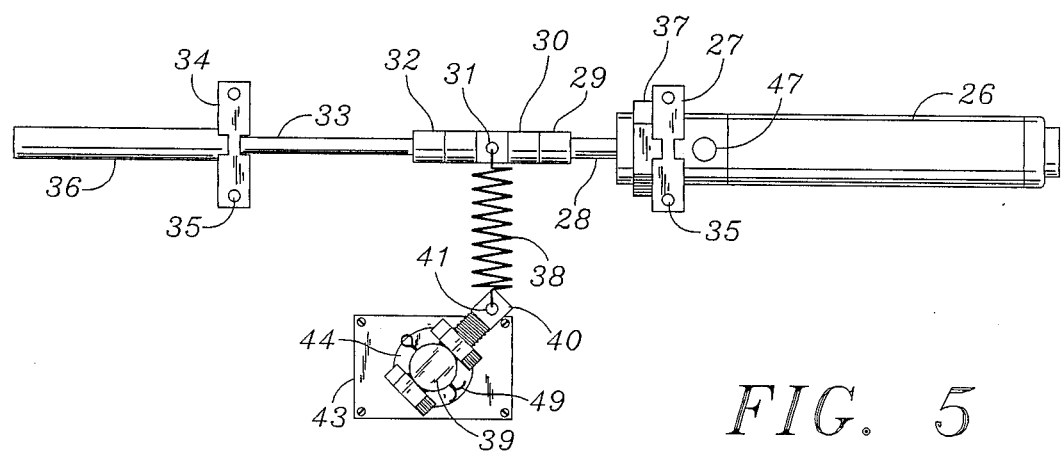
FIG. 5

4,946,357

DIVERTER CHUTE ASSEMBLY FOR MOLDING MACHINE

FIELD OF THE INVENTION

The present invention relates generally to sorting apparatus and more particularly to a diverter chute assembly for automatically separating the molded product from the runner in the injection molding process. The diverter chute assembly has a deflection plate pivotally mounted within a housing. The defelection plate is responsive to control signals generated in synchronization with the ejection of the product and the runner such that the product is directed to a first collection area and the runner is directed to a second collection area. Chute diverters permit flexibility in the placement of collection bins which gather the product and the runners.

BACKGROUND OF THE INVENTION

Sorting apparatus are well known for sorting items according to a given criteria. For example, sorters are commonly used to sort good products from defective products. A diverter chute may be used to divert the defective product away from the normal processing path and into a bin where it can later be collected and disposed of. Sorting apparatus are also used to sort good products according to given criteria. For example, apples may be sorted into various bins according to their size or weight.

Sorting apparatus are also known which are used in the injection molding process to separate good products from defective products. These sorters may be responsive to a variety of sensors. The sensors measure such parameters as the size and weight of the products. Sensors may also be mounted on the mold to indicate a malfunction of the injection molding process.

In each situation a diverter chute is used to divert the product from the normal processing path and into a bin where it may later be collected. Also, in each instance where the diverter chute is used in prior art injection molding systems, the chute must be responsive to signals generated by specially constructed and mounted sensing devices.

Applicant's co-pending U.S. patent application Ser. No. 021,132, filed Mar. 3, 1987 and now Pat. No. 4,892,472, discloses a diverter chute for separating runners and molded products dispensed from an injection mold assembly. The disclosed chute system comprises a dispensing chute disposed proximate the mold assembly wherein the dispensing chute is operative to direct materials passing into the chute to one of two collection areas in response to control signals. The control signals are generated in synchronization with ejection of the product or the runner such that the product is directed into a first collection area and the runner is directed into a second collection area. This prior art application is directed to a means for sensing the ejection of products and runners from an ejection molding system and causing the products and runners to be diverted into separate bins.

Prior art diverter chutes deflect items in one of two fixed directions, thereby requiring that the material handling system be designed to accommodate the fixed directions provided by the prior art diverter chute.

Prior art diverter chutes do not take advantage of the fact that the parts to be separated may enter the chute from different areas. For example, the part to be sorted into a first bin may enter the chute on the chute's left side and the part to be sorted into a second bin may enter the chute from the chute's right side. Taking advantage of such a situation eliminates the need for sensors and control signals. That is, passive sorting of the parts would channel them to the correct bins without the need for a moving diverter which is responsive to external signals.

As such, although the prior art has recognized to a limited extent the problem of separating products from runners in the injection molding process, the proposed solutions have to date been ineffective in providing a satisfactory remedy.

SUMMARY OF THE INVENTION

The present invention comprises a diverter chute assembly for automatically separating the molded product from the runner in the injection molding process. The diverter chute assembly has a deflection plate pivotally mounted within a housing. The deflection plate is responsive to control signals generated in synchronization with the ejection of the product and the runner such that the product is directed to a first collection area and the runner is directed to a second collection area. Chute diverters permit flexibility in the placement of collection bins which gather the products and runners.

The use of a chute diverter in the present invention allows the diverter chute assembly to be set up so that the products and the runners can be diverted in either of two opposite horizontal directions and can also be allowed to pass straight down through the diverter chute assembly and to be ejected through the bottom of the diverter chute assembly. Diversion of the products and runners is completely independent. That is, the products and runners can be diverted in opposite horizontal directions, the same horizontal direction, both downward, or one can be diverted down while the other is diverted in either of the two horizontal directions.

The deflector plate, which is used to deflect the products and the runners to their respective chutes can be secured in a vertical position for possive sorting. Thus, both chutes are opened such that as products enter the diverter chute assembly above the product chute, the products fall into the product chute, and as runners enter the diverter chute assembly above the runner chute, the runners fall into the runner chute. Securing the diverter plate in the vertical position is advantageous when employing molds which eject the products and runners at separate positions. This eliminates the need for making the diverter plate responsive to external signals. Therefore, the present invention can be used both in situations where the diverter plate is responsive to external signal for separating the products from the runners and also in situations where the diverter plate may be secured in the vertical position so that the products and runners are allowed to drop directly into their respective chutes during passive sorting.

BRIEF DESCRIPTION OF THE DRAWINGS

FIG. 3 is a cutaway perspective view showing the chute diverter in a first position and also showing the chute diverter in phantom in a second position;

FIG. 4 is a perspective view of a chute diverter showing its cushioned upper surface; and FIG. 5 is an enlarged view of the actuator and linkage.

DESCRIPTION OF THE PREFERRED EMBODIMENT

The diverter chute assembly of the present invention is illustrated in FIGS. 1-5 of the drawings which depict a presently preferred embodiment of the invention.

Figure 1:
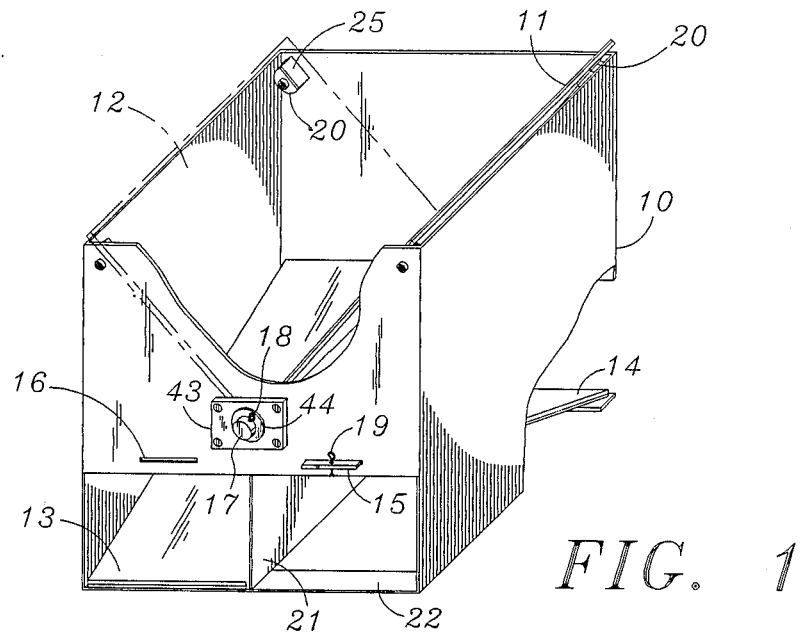
FIG. 1 is a perspective view of the diverter chute assembly showing the diverter plate in a first position and also showing the diverter plate in phantom in a second position.

Referring to FIG. 1, a housing 10 contains a deflector plate 11 which is pivotally disposed within the housing 10. The deflector plate 11 is depicted in FIG. 1 as being disposed in a first position and is also shown in phantom, being disposed in a second position.

A first chute 45 is located beneath the deflector plate to receive parts ejected from the mold assembly when the deflector plate is disposed in a first position. A first chute diverter 13 is detachably mounted within said first chute for diverting products in either of two directions and is also removable to allow products to drop straight down through the first chute without being diverted. A second chute 46 is also located beneath said deflector plate 11 to receive runners ejected from the mold assembly when the deflector plate is disposed in a second position 12, as shown in phantom in FIG. 1. A second chute diverter 14 is detachably mounted within the second chute 46 for diverting runners in either of two directions and is also removable to allow runners to drop straight through the second chute without being diverted.

Figure 2:
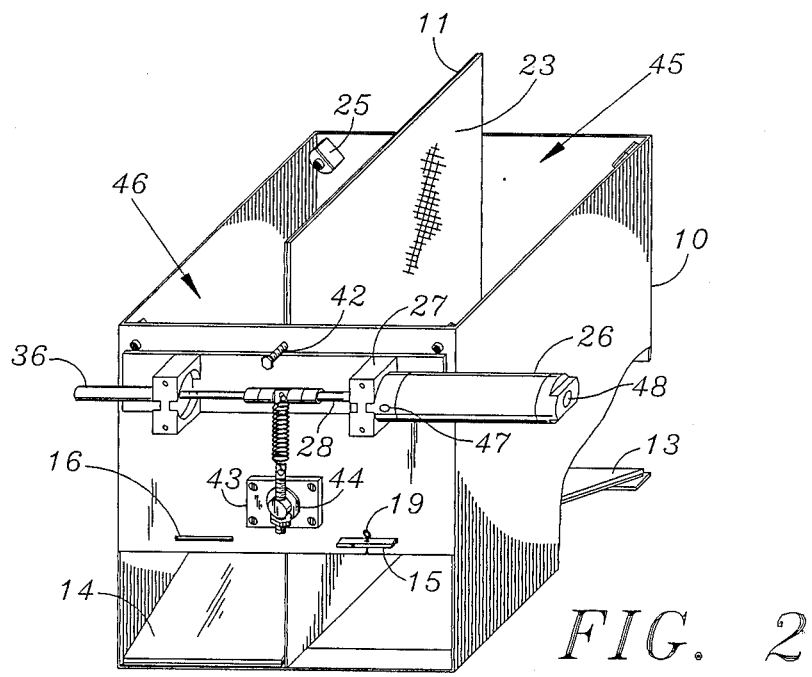
FIG. 2 is a perspective view of the diverter chute assembly shownning the actuator and linkage and showing the diverter plate in the vertical position.

Referring now to FIG. 2, an air actuator 26 has a piston 28 for translating the deflector plate between the first and second position. Extending the piston 28 from the actuator 26 translates the deflector plate 11 to the first position. Retracting the piston 28 into the actuator 26 translates the deflector plate 11 to its second position 12.

Referring to FIG. 5, the air actuator 26 is mounted to the housing 10 with a mount bracket 27. An actuator mounting nut 37 engages the air actuator 26 and secures the air actuator 26 within the mounting bracket 27. Screws 35 attach the mounting bracket 27 to the housing 10. A first air inlet 47 in the air actuator 26 permits the attachment of a first air line such that when air pressure is applied to the air inlet 47 the piston 28 will retract within the air actuator 26. A second air inlet 48, best shown in FIG. 2, permits the attachment of a second air line such that when air pressure is applied to the air inlet 47, the piston 28 will extend from the air actuator 26.

The piston 28 is attached to a spring mount 30 which is likewise attached to a follower 33. The follower 33 is received by a follower guide 36 which is attached to the housing 10 with a mount 34. Screws 35 are used to attach the mount 34 to the housing 10. Annular rubber stops or snubbers 29 and 32, on the piston 28 and the follower 33 respectively, function to lessen the impact of the spring mount 30 to the actuator mount 27 or the follower guide mount 34 when the piston 28 is either fully retracted into the air actuator 26 or fully extended from the air actuator 26. The snubbers 29 and 32 are made of a durable and resilient material such as rubber. A spring 38 is attached to the spring mount 30 through the spring mount aperture 31. The opposite end of the spring 38 is attached to an arm 40 through an aperture 41 in the arm 40. The arm 40 is attached and perpendicular to the pivot pin 39. The pivot pin 39 is connected to the deflector plate 11 such that rotation of the pivot pin 39 will cause a translation of the deflector plate 11. A washer 44 is placed over the pivot pin 39 and a cotterpin 49 secures the pivot pin 39 in place. The pivot pin 39 passes through the pivot mount 43 which serves both to reinforce the housing 10 in the area around the pivot pin 39 and also serves as a bearing surface for the pivot pin 39. On the opposite side of the diverter chute assembly is a like pivot pin 17 similarly mounted in a pivot mount 43. A washer 44 is installed over the pivot pin 17 and a cotter key 18 secures the pivot pin 17 within the pivot mount 43.

Retraction of the piston 28 into the cylinder 26 translates the spring mount 30 to the right as viewed in FIG. 5. This puts tension on the spring 38 which then urges the arm 40 to the right, thereby causing the pivot pin 39 to rotate clockwise. This results in a translation of the deflector plate 11 from its first position to its second position. Extension of the piston 28 into the cylinder 26 translates the spring mount 30 to the left as viewed in FIG. 5. This puts tension on the spring 38 which then urges the arm 40 to the left, thereby causing the pivot pin 39 to rotate counterclockwise. This results in a translation of the deflector plate 11 from its second position to its first position.

The use of the spring mount 30, spring 38, and arm 40 to effect rotation of the pivot pin 39 has several advantages. It eliminates the need for a slotted joint that would be required to connect the arm directly to the piston. The arm could be connected directly to the piston by extending its length and providing a slot in the arm through which it would be slidably connected to the piston. The slot is necessary since a direct connection of the arm to the piston, such as with a pivot pin, would result in binding as the piston translates and the arm rotates.

The use of a slotted joint to connect the arm to the piston would result in wear as the piston connection travels within the arms slot. This wear is eliminated by using the spring 38 of the present invention.

A direct connection of the piston to the arm could also result in jamming of the diverter chute assembly if a product or runner were to become wedged between the deflector 11 and the housing 10 during operation. The use of the spring 38 instead of a direct connection of the arm to the piston permits the deflector plate 11 to translate between its first and second positions with considerably less compressive force than a direct connection would permit. Indeed, the deflector plate could be held stationary in any given position during operation, and the piston 28, through the spring 38, would merely urge the deflector plate 11 between its first and second position without binding.

For example, if a product were to stick in the mold and drop into the diverter chute assembly a moment later than it should have, then the product could become trapped between the deflector plate 11 and the housing 10 as the deflector plate 11 approaches its first position. In an apparatus with a directly connected arm and piston, this could result in a jam. In the present invention, however, the deflector plate 11 merely momentarily captures the product, under tension of the spring 38, then releases it as the deflector plate 11 translates to its second position. The use of spring 38 not only helps prevent jamming, but it also minimizes the harmful effects to both the diverter chute assembly and to the product any time that a product becomes trapped between the deflector plate 11 and the housing 10.

The use of spring 38 also assures a rapid translation of the deflector plate 11 between its first and second positions, thereby permitting the deflector plate 11 to remain in its first and second positions for a greater amount of time. This further reduces the probability of jamming since the deflector plate 11 spends a greater percentage of each cycle in its first and second positions, and less time in transition therebetween. It is therefore less probable that a product or runner can be trapped between the deflector plate 11 and the housing 10, since trapping can only occur while the deflector plate 11 is in transition.

The use of spring 38 also assures more reliable operation of the deflector plate 11 by reducing the static coefficient of friction which must be overcome to initiate motion. The deflector plate's 11 inertia and the pivot pins' 17 and 39 static coefficient of friction will tend to maintain the deflector plate's 11 disposition in either the first or second position as tension is applied to the spring 38 by the piston 28. The deflector plate 11 only begins to move after considerable tension has been applied to the spring 38, thereby overcoming the deflector plate's 11 inertia and the pivot pins' 17 and 39 static coefficient of friction. The piston 28 overcomes its own static coefficient of friction and begins its travel before the deflector plate 11 begins to translate, thereby reducing the static coefficient of friction that must be overcome in order to initiate translation of the deflector plate 11 between its first and second positions. That is, the total static coefficient of friction that must be overcome to translate the deflector plate 11 is comprised of the static coefficient of friction of the pins 17 and 39 in relation to their bearing surfaces within the pivot mounts 43 and also of the static coefficient of friction between the piston 28 and its seals within the air actuator 26. The use of spring 38 permits motion to occur by overcoming these two sources of static friction serially, instead of simultaneously, as would be required if a direct connection were utilized. This makes the operation of the diverter chute assembly more reliable, particularly under adverse circumstances, such as inadequate lubrication, or contamination of the seals and bearing surfaces.

The follower guide 36 cooperates with the follower 33 to limit the motion of the piston 28 to translation along the piston's longitudinal axis. This prevents binding and reduces wear on the seals of the air actuator 26, thereby insuring long life and reliable operation of the air actuator 26.

A stop 42, shown in FIG. 2, which comprises a hex head bolt, is used to secure the deflector plate 11 in the vertical position, thereby permitting products and runners to fall directly into the first and second chutes, 45 and 46 respectively, without being deflected by the deflector plate 11. The first chute 45 is defined as that space to the right of the deflector plate 11 and within the housing 10, as viewed in FIG. 2. The second chute 46 is defined as that space to the left of the deflector plate 11 and within the housing 10, as viewed in FIG. 2.

This passive sorting of the products and runners thus eliminates the need for making the deflector plate 11 responsive to external signals when the products and runners can be made to fall directly into the first and second chutes, 45 and 46 respectively. This occurs in situations where the product is ejected from the mold first, for instance, and the mold then moves a few inches and the runner is ejected from the mold. Therefore, the present invention can be used for both situations where a deflector plate is required to separate products from runners, and situations where the deflector plate is not required to separate products from runners.

A deflector plate cushion 23 is bonded with an adhesive to the deflector plate 11 to cushion parts as they fall from the mold into the diverter chute assembly. A chute diverter cushion 24 is likewise bonded to the first chute diverter 13 to similarly cushion the part as it falls from the deflector plate 11 onto the first chute diverter 13. A resiliant and durable material such as rubber or Volex EC86-12, manufactured by Voltek, is preferred for use as the deflector plate cushion 23 and the chute diverter cushion 24. Both sides of the deflector plate 11 can be covered with deflector plate cushions in applications where the items to be sorted require such care and handling. Likewise, both the first chute diverter 13 and the second chute diverter 14 can also be covered with a cushioning material for such applications.

Both the first chute diverter 13 and the second chute diverter 14 can be installed in their respective chutes in either of two orientations. Each chute diverter 13 and 14, is installed in its respective chute by inserting the integral tab, such as tab 15 best shown in FIG. 4, into the desired one of the four slots 16 of the housing 10. A cotter pin 19 secures the tab 15 within the slot 16. Two slots, one on each of two opposite sides of the housing 10 are provided for the first chute and likewise two slots are provided for the second chute. As shown in FIG. 3, installation of a chute diverter in the slot on one particular wall of the housing results in ejection of the parts or runners out the opening in the opposite wall of the housing 10. FIG. 3 depicts a chute diverter 13 installed in a first position and also depicts the same chute diverter in phantom as it can be installed in a second position.

When the chute diverter 13 is installed in the first position, products deflected to the first chute 45 by the chute deflector plate 11 will be discharged from the first chute 45 through the first opening 52. When the chute diverter 13 is installed in the second position as shown in phantom 51, then the products deflected to the first chute 45 by the chute deflector plate 11 will be discharged from the first chute 45 through the second opening 53. If the chute diverter 13 is not installed in the first chute 45 in either position, then the products deflected to the first chute 45 by the chute deflector plate 11 will fall straight through the first chute 45 and will be discharged from the third opening 54 in the bottom of the first chute 45.

Runners deflected to the second chute 46 can likewise be directed to a first, second, or third opening in the second chute by positioning the second chute diverter 14 in a first or second position, or by not installing the second chute diverter 14 in the second chute 46.

Therefore, both products and runners can be diverted in each of three different directions. This provides flexibility in the positioning of bins or other material handling apparatus to receive the products and runners from the diverter chute assembly.

It is understood that the exemplary diverter chute assembly described herein and shown in the drawings represents only a presently preferred embodiment of the invention. Indeed, various modifications and additions may be made to such embodiment without departing from the spirit and scope of the invention. For example, the placement and orientation of the chute diverters could be changed to eject the parts or runners in directions different from those illustrated. Also, means other than an air actuator/spring mechanism may be used to translate the diverter plate. Thus, these and other modifications and additions may be obvious to those skilled in the art and may be implemented to adapt the present invention for use in a variety of different applications.

What is claimed is:

1. A diverter chute assembly, for separating molded products from runners separately ejected from a mold assembly, comprising:
    (a) a housing;
    (b) a deflector plate, disposed within said housing and pivotally attached to said housing;
    (c) an actuator for translating said deflector plate between first and second positions;
    (d) a first chute, disposed within said housing, for receiving products ejected from the mold assembly when said deflector plate is disposed in a first position;
    (e) a first chute diverter, detachably mounted within said first chute for diverting products entering said first chute in either of two directions and also removable to allow products to drop straight through said first chute without being diverted;
    (f) a second chute disposed within said housing for receiving runners ejected from the mold assembly when said deflector plate is disposed in a second position; and
    (g) a second chute diverter, detachably mounted within said second chute for diverting runners in either of two directions and also removable to allow runners to drop straight through said second chute without being diverted.

2. A diverter chute assembly as recited in claim 1 further comprising:
    (a) a spring attached to said actuator;
    (b) an arm connected to said spring and said deflector plate so as to cause said deflector plate to translate between first and second positions in response to translation of the actuator.

3. A diverter chute assembly as recited in claim 2 further comprising:
    (a) a follower attached to the piston of said actuator;
    (b) a guide attached to said housing and receptive to said follower; and
    (c) wherein said follower and said guide cooperate to limit the motion of the piston of said actuator to translation along the piston's longitudinal axis.

4. A diverter chute assembly as recited in claim 3 further comprising a stop for securing said deflector plate in a vertically disposed position such that said first and second chutes are continually open to receive parts and runners, respectively.

5. A diverter chute assembly as recited in claim 4 further comprising:
    (a) a cushion bonded to at least one surface of said deflector plate; and
    (b) a cushion bonded to the upper surface of at least one of said chute diverters.

6. The apparatus of claim 1, said mold assembly being associate with an injection molding machine.

* * * * *